(12) United States Patent
Baumann

(10) Patent No.: US 11,692,575 B2
(45) Date of Patent: Jul. 4, 2023

(54) PLASTIC COMPONENT COMPRISING AN ADD-ON PART ANCHORED THERETO

(71) Applicant: Webasto SE, Stockdorf (DE)

(72) Inventor: Matthias Baumann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 659 days.

(21) Appl. No.: 16/640,452

(22) PCT Filed: Aug. 8, 2018

(86) PCT No.: PCT/EP2018/071540
§ 371 (c)(1),
(2) Date: Feb. 20, 2020

(87) PCT Pub. No.: WO2019/042729
PCT Pub. Date: Mar. 7, 2019

(65) Prior Publication Data
US 2020/0208669 A1    Jul. 2, 2020

(30) Foreign Application Priority Data

Aug. 31, 2017  (DE) .................... 10 2017 008 170.0

(51) Int. Cl.
*F16B 17/00*    (2006.01)
*B29C 65/08*    (2006.01)
*B29C 65/00*    (2006.01)

(52) U.S. Cl.
CPC ............ *F16B 17/008* (2013.01); *B29C 65/08* (2013.01); *B29C 66/30325* (2013.01);
(Continued)

(58) Field of Classification Search
CPC .............. B29C 66/712; B29C 66/7392; B29C 66/7394; B29C 66/742; B29C 66/723; F16B 17/008; F16B 5/01; F16B 5/04
See application file for complete search history.

(56) References Cited

U.S. PATENT DOCUMENTS 3,499,808 A  *  3/1970  Obeda .................... B29C 66/21
                                                 156/580.2
3,716,092 A  *  2/1973  Serewicz ................. B64C 3/00
                                                 411/82.5
(Continued)

FOREIGN PATENT DOCUMENTS

CN        106488840 A      3/2017
EP         2246178 A1     11/2010
(Continued)

OTHER PUBLICATIONS

International Search Report for PCT/EP2018/071540 dated Nov. 14, 2018 in English and German (19 pages).
(Continued)

*Primary Examiner* — Daniel J Wiley
(74) *Attorney, Agent, or Firm* — Fitch, Even, Tabin & Flannery, LLP

(57) ABSTRACT

A plastic component having a core that has a thermoset matrix and an add-on part anchored to the core. At least the securing region of the add-on part can be formed from a thermoplastic and is secured by the securing region to the core of the plastic component, the securing region being attached to the core or inserted or pressed into the core, bonding, in a fusible state produced by the application of energy, in particular by ultrasonic vibrations, with the core and being anchored thereto or therein after solidification, in particular, as a connection anchor.

7 Claims, 1 Drawing Sheet

Figures 1, 2:
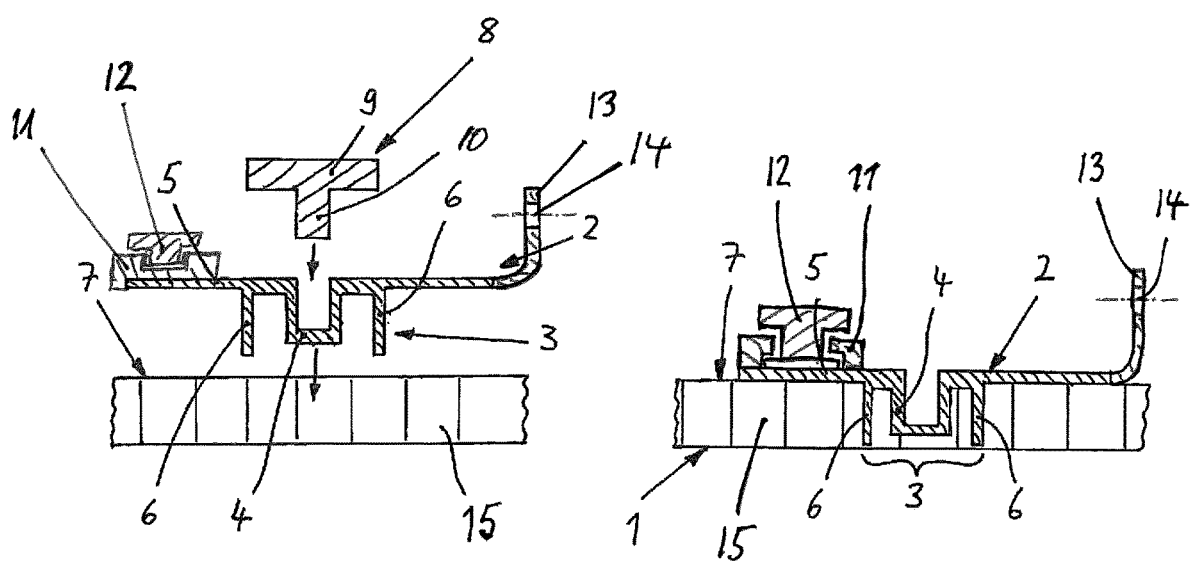

(52) U.S. Cl.
CPC .......... *B29C 66/474* (2013.01); *B29C 66/712* (2013.01); *B29C 66/7392* (2013.01); *B29C 66/7394* (2013.01)

(56) References Cited

U.S. PATENT DOCUMENTS

| | | | | |
|---|---|---|---|---|
| 4,265,688 A * | 5/1981 | Gorski | ................ | B29D 24/005 52/794.1 |
| 4,761,871 A * | 8/1988 | O'Connor | ............. | B29C 66/721 156/92 |
| 4,817,264 A * | 4/1989 | Worthing | .......... | B29C 66/72525 29/525.07 |
| 5,310,434 A * | 5/1994 | Vives | ...................... | F16B 4/004 156/92 |
| 5,397,408 A * | 3/1995 | Guzik | .................... | B29C 66/54 156/221 |
| 5,437,750 A * | 8/1995 | Rinse | ................ | B29C 66/72525 156/293 |
| 6,913,666 B1 * | 7/2005 | Aeschlimann | .......... | B29C 66/74 411/908 |
| 8,151,541 B2 * | 4/2012 | Aeschlimann | .... | B29C 66/82261 52/704 |
| 9,032,693 B2 * | 5/2015 | Clinch | ..................... | F16B 5/01 52/787.1 |
| 10,427,359 B2 * | 10/2019 | Dizdar | ................. | B29C 65/603 |
| 11,077,621 B2 * | 8/2021 | Mayer | ................... | B29C 65/081 |
| 2005/0125985 A1 * | 6/2005 | Adams | ................... | B29C 66/21 29/524.1 |
| 2005/0126680 A1 | 6/2005 | Aeschlimann et al. | | |
| 2007/0102094 A1 * | 5/2007 | de Groot | .............. | B29C 66/721 264/445 |
| 2008/0047107 A1 * | 2/2008 | Clinch | ................ | B29C 66/1122 16/404 |
| 2008/0199249 A1 * | 8/2008 | Clinch | ................... | F16B 11/00 411/487 |
| 2011/0062617 A1 * | 3/2011 | Lehmann | ............ | B29C 66/8227 425/432 |
| 2011/0206898 A1 * | 8/2011 | Hayslip | ............... | B29C 66/7392 428/131 |
| 2012/0155954 A1 | 6/2012 | Bucker et al. | | |
| 2014/0044476 A1 * | 2/2014 | Cove | ..................... | B29C 65/645 403/270 |
| 2015/0300389 A1 * | 10/2015 | Mayer | ................. | B29C 66/7392 156/293 |
| 2015/0306817 A1 * | 10/2015 | Lehmann | ............ | B29C 66/7487 156/196 |
| 2015/0362005 A1 * | 12/2015 | Meyers | ..................... | F16B 5/01 156/293 |
| 2016/0167288 A1 * | 6/2016 | Rodgers | ................ | B29C 66/112 156/73.1 |
| 2016/0250804 A1 * | 9/2016 | Wang | ................ | B29C 66/81875 403/267 |
| 2016/0311153 A1 * | 10/2016 | Mayer | ............... | B29C 66/30326 |
| 2016/0341234 A1 * | 11/2016 | Germann | ........... | B29C 66/0242 |
| 2017/0144364 A1 | 5/2017 | Mayer et al. | | |
| 2017/0144367 A1 | 5/2017 | Mayer et al. | | |
| 2017/0297271 A1 * | 10/2017 | Dizdar | .................. | B29C 66/872 |
| 2017/0334147 A1 * | 11/2017 | Mayer | ............... | B29C 66/73116 |

FOREIGN PATENT DOCUMENTS

| | | |
|---|---|---|
| JP | H01146725 A | 6/1989 |
| JP | 2005001295 A | 1/2005 |
| WO | 2011003891 A1 | 1/2011 |
| WO | 2014075200 A1 | 5/2014 |
| WO | 2015181300 A1 | 12/2015 |
| WO | 2016/071335 A1 | 5/2016 |
| WO | 2016/198547 A1 | 12/2016 |

OTHER PUBLICATIONS

CNIPA; Application No. 201880056193.9; Search Report dated Sep. 7, 2021.

* cited by examiner

PLASTIC COMPONENT COMPRISING AN ADD-ON PART ANCHORED THERETO

CROSS-REFERENCE TO RELATED APPLICATIONS

This application is a U.S. national phase application filed under 35 U.S.C. § 371 of International Application No. PCT/EP2018/071540, filed 8 Aug. 2018, designating the United States, which claims priority from German Patent Application No. 10 2017 008 170.0, filed 31 Aug. 2017, which are hereby incorporated herein by reference in their entirety for all purposes.

FIELD

The invention relates to a plastics component with a core having a thermoset matrix and with an add-on part anchored thereto.

BACKGROUND

In a plastics component that contains a core having a thermoset matrix, it is known to introduce an anchor pin consisting of a thermoplastic material into the core of the plastics component and to soften said anchor pin therein via mechanical excitation, e.g. ultrasound vibrations generated by means of a sonotrode, such that a portion of the plastics material of the anchor pin flows into the core and, after hardening therein, holds the anchor pin in a fixed and anchored manner. An add-on part can be fastened to the plastics component by an anchor pin of this type.

WO 2014/075200 A1 discloses such fastening of an add-on part by means of a thermoplastic anchor pin, which has been inserted into a recess in the plastics component and softened therein using a sonotrode and, after it has hardened, securely holds the add-on part on the plastics component.

The pressing of thermoplastic dowels into a thermoset matrix of a plastics component such that subsequently screws can be screwed into the dowels and can fix add-on parts is also known. In this case, the thermoset matrix preferably consists of a porous base material or alternatively of a sandwich structure with an open core.

For the fastening of add-on parts, additional connection or anchor components, such as anchor pins or else thermoplastic dowels, are thus required.

The invention is therefore based on the object of providing a plastics component mentioned in the introduction, to which an add-on part can be secured with little outlay.

Said object is achieved according to the invention in the case of the plastics component mentioned in the introduction in that the add-on part, at least in its anchoring region, is formed from a thermoplastic material and the anchoring region of the add-on part is secured to the core of the plastics component, wherein the anchoring region is positioned on the core or inserted or pressed-in in the core, bonds to the thermoset matrix of the core in a fluid state created by means of an input of energy and in particular by means of ultrasound vibrations, and is anchored thereon or therein in the solidified state, in particular as a connection anchor.

SUMMARY

Advantageous refinements of the invention are specified in the dependent claims.

By virtue of the fact that the add-on part itself, or at least an anchoring region as a part or portion of the add-on part, provides the anchoring or the connection anchor, further anchoring parts are not required. Since the anchoring region, or at least a portion thereof, is plasticized and converted into a fluid or partially fluid state by an input of energy, the anchoring region can penetrate into and bond intimately with the core material or the thermoset matrix of the core. After the thermoplastic material of the anchoring region solidifies and hardens, it forms a secure anchoring in the plastics component. The input of energy preferably takes place by means of ultrasound vibrations using a sonotrode.

According to one preferred embodiment, the add-on part, at least in its anchoring region or in its entirety, is formed exclusively from a thermoplastic material. In the case of a configuration of this type, in which it is made from the same material, the add-on part, in particular as a plastic injection-molded part, can be cost-effectively produced and easily plasticized.

The core is expediently formed from a porous base material or from a sandwich structure with an open core, in particular from a PU composite component (e.g. sandwich structure consisting of polyurethane, glass fiber and paper honeycomb).

The core may have a cover layer, against which the add-on part bears and through which the anchoring region or the depression of the add-on part is pressed in. The cover layer is formed e.g. from glass fiber-reinforced PU. The core may also be covered by a cover layer on the opposite side thereof.

According to one preferred embodiment, the anchoring region of the add-on part contains at least one depression which is inserted or pressed into the core. The depression is formed in particular such that it protrudes inward from the add-on part or from an outer cover plate of the add-on part toward the plastics component. The depression is formed e.g. as an annular or pot-shaped portion of the anchoring region or of the add-on part. Accordingly, the depression is a portion or projection protruding from the add-on part and inserted in the depth of the core.

The anchoring region may have yet further anchoring portions which are inserted or pressed into the core and likewise form an anchoring. An anchoring portion of this type is formed e.g. as a pin or as a plate or else in an annular manner and may be arranged on the outside next to the depression and e.g. in an annular manner or in the form of a segment of a ring around the depression.

The anchoring region or the depression is expediently formed to receive a sonotrode which, in engagement in said depression, transfers energy by means of ultrasound vibrations directly to the thermoplastic material of the anchoring region of the add-on part.

On the other hand, the anchoring region of the add-on part may also be of planar form. The contact surface of the core is then adapted accordingly.

The add-on part may expediently have at least one functional or attachment component, for example a slide, a guide or an opening or a bore e.g. on a web of the add-on part, which is formed from the thermoplastic material of the add-on part. The production outlay can thus be significantly reduced.

The invention is explained in more detail below on the basis of one exemplary embodiment of a plastics component according to the invention with reference to the drawing, in which:

BRIEF DESCRIPTIONS OF THE DRAWINGS

FIG. 1 shows an exploded sectional view of a PU composite component with an add-on part and with a sonotrode before the fastening of the add-on part; and FIG. 2 shows a sectional view of the PU composite component with an add-on part secured thereto.

DETAILED DESCRIPTION

A plastics component 1 is formed e.g. as a PU composite component and has a core 15 with a thermoset matrix which is formed, for example, as an open sandwich structure, e.g. a paper honeycomb structure, or from a porous base material such as e.g. rigid polyurethane foam and can be covered in each case by a cover layer (not illustrated) e.g. consisting of glass fiber-reinforced PU.

An add-on part 2 is provided for securing to the core 15 of the plastics component 1. By way of the add-on part 2, a connection to other parts can be produced and forces can be transmitted onto the plastics component 1. The add-on part 2 may contain functional or add-on parts such as e.g. a slide 11 to be mounted on a guide 12 which mounts the plastics component 1, forming e.g. a sliding headliner, in a manner displaceable via the slide 11. The add-on part 2 may also be formed with a web 13 which contains a through-hole 14 or the like for connection to another component.

The add-on part 2, at least in an anchoring region 3 and preferably in its entirety, is produced from thermoplastic material. The anchoring region 3 of the add-on part 2 shown in FIG. 1 has a depression 4, for example of cylindrical form, which protrudes from a portion formed as a cover plate 5, and anchoring portions 6 which protrude from the cover plate 5 next to the depression 4. The anchoring portions 6 are pin-shaped or plate-shaped elements or are formed as an element surrounding the depression 4 in an annular manner.

The add-on part 2 is fastened to the plastics component 1 by virtue of being guided against the side surface 7 of the plastics component 1 and being pressed into the core 15 of the plastics component 1—through an optionally present cover layer—until it has reached its envisaged position, in which the cover plate 5 bears against the side surface 7 of the plastics component 1 or of the core 15. When the anchoring region 3 with the depression 4 and the anchoring portions 6 is being pressed into the core 15, the flexible core material is correspondingly displaced.

A sonotrode 8 is guided up to and brought into contact with the add-on part 2. The sonotrode 8 contains, for example, a cylindrical journal 10 which projects out from a base 9, the shape and size thereof being adapted to the depression 4 of the anchoring region 3 of the add-on part 2, and said journal 10, in the operating position thereof in the depression 4, by way of ultrasound vibrations softens the thermoplastic material and plasticizes it to the extent that the fluid plastics material of the depression 4 can enter into an intimate bond with the surrounding core material of the core 15 of the plastics component 1 and with the optionally present cover layer. Given a sufficiently high power of the sonotrode 8, the ultrasound vibrations can also plasticize the anchoring portions 6 such that, in a fluid state, they too can enter into an intimate bond with the core material of the core 15 of the plastics component 1 or with the cover layer. The thermoset matrix of the core material, which is deformed or displaced in the region of the pressed-in add-on part and is hardened again by the plastics material, is otherwise not adversely affected by the input of energy.

After the sonotrode 8 has stopped generating the ultrasound vibrations, the plastics material of the anchoring region 3 of the add-on part 2 hardens and the anchoring region 3 forms a stable and permanent connection anchor which fixedly holds the add-on part 2 on the core 15 and the optionally present cover layer of the plastics component 1. The sonotrode 8 is removed during or after the hardening of the plastics material.

FIG. 2 shows the plastics component 1 with the add-on part 2 anchored thereto. The configuration of the anchoring region 3, of the depression 4 and of the anchoring portions 6 are illustrated by way of example. Other configurations of the anchoring region 3 with parts or connection anchors penetrating into or bearing on the open or open-celled core material may also be used, insofar as they make an intimate bond or anchoring possible.

In the case of said plastics component 1, the anchoring of the add-on part 2 thus does not require any additional components such as screws, rivets or dowels or the like.

Since the anchoring region 3, when the add-on part 2 is in the installed state, is located underneath the cover plate 5 in the core material and is substantially covered by the cover plate 5, the result is a preferred visual appearance without additional screws or rivets.

The add-on part 2 may be pressed into the core material of the core 15 of the plastics component 1, optionally through a cover layer, by a dedicated pressing device or else by means of the sonotrode 8.

According to a further refinement, at least one recess may be formed in the core material of the plastics component 1 and is adapted substantially to or matches the form of the anchoring region 3 such that, when the add-on part 2 is being pressed in, less core material has to be deformed. This preparation of the plastics component 1 is expedient in particular when a less deformable core material is used.

The add-on part 2 may be formed entirely or at least in its anchoring region 3 from a thermoplastic material.

In a manner which deviates from the embodiment shown in FIGS. 1 and 2, the add-on part 2, at least in its anchoring region 3, may also be of planar form such that it is fastened and anchored in planar contact with the core 15 of the plastics component 1 which is likewise planar at least in the contact region. "Anchoring" thus means not only penetration into the core material in a displacing and deforming manner, but also a laminar bond. A sonotrode used here has a correspondingly adapted form.

Although the use of a sonotrode 8 to generate the energy required to plasticize the thermoplastic material of the anchoring region 3 of the add-on part 2 is particularly preferred, additionally or alternatively the input of energy may also be effected e.g. by a heating device such as an infrared heater.

The individual features of the invention disclosed in the description and on the basis of the exemplary embodiment as well as in the figures may be combined with the subject matter of the invention in its general form in any technically expedient arrangements and configurations.

LIST OF REFERENCE SIGNS

| | |
|---|---|
| 1 | Plastics component |
| 2 | Add-on part |
| 3 | Anchoring region |
| 4 | Depression |
| 5 | Cover plate |
| 6 | Anchoring portion |
| 7 | Side surface |
| 8 | Sonotrode |
| 9 | Base |
| 10 | Journal |
| 11 | Slide |

| | |
|---|---|
| 12 | Guide |
| 13 | Web |
| 14 | Through-hole |
| 15 | Core |

The invention claimed is:

1. A plastics component with a core having:
a thermoset matrix and with an add-on part anchored thereto,
wherein the add-on part, at least in its anchoring region, is formed from a thermoplastic material and the anchoring region of the add-on part is secured to the core of the plastics component,
wherein the anchoring region is pressed-in in the core, bonds to the thermoset matrix of the core in a fluid state created by means of an input of energy and in particular by ultrasound vibrations, and is anchored therein in the solidified state as a connection anchor,
wherein the add-on part has at least one functional or attachment component which is formed from the thermoplastic material, and
wherein the anchoring region of the add-on part has at least one depression which is inserted or pressed into the core.

2. The plastics component of claim 1, wherein the add-on part, at least in its anchoring region or in its entirety, is formed exclusively from a thermoplastic material.

3. The plastics component of claim 1, wherein the core consists of a porous base material or of a sandwich structure with an open core of a PU composite component.

4. The plastics component of claim 1, wherein the anchoring region of the add-on part has at least one anchoring portion which is formed as a pin, plate or ring inserted or pressed into the core.

5. The plastics component of claim 1, wherein the anchoring region or the depression is formed to receive a sonotrode.

6. The plastics component of claim 1, wherein the anchoring region is of planar form.

7. The plastics component of claim 1, wherein the core has a cover layer, against which the add-on part bears and through which the anchoring region or the depression of the add-on part is pressed in.

* * * * *